United States Patent [19]

Jaatinen

[11] Patent Number: 4,907,940
[45] Date of Patent: Mar. 13, 1990

[54] CROSS-CUTTING SAW

[75] Inventor: Per A. Jaatinen, Helsinki, Finland

[73] Assignee: Oy Raumatic AB, Nastola, Finland

[21] Appl. No.: 118,223

[22] Filed: Nov. 9, 1987

[30] Foreign Application Priority Data

Oct. 7, 1987 [FI] Finland .................. 874411

[51] Int. Cl.$^4$ .............................. B65G 57/03
[52] U.S. Cl. .................... 414/789.6; 83/91;
83/93; 414/791.6; 414/794.3
[58] Field of Search ............... 83/86, 87, 90, 91, 96;
414/790.3, 794.7, 794.3, 789.6, 791.6

[56] References Cited

U.S. PATENT DOCUMENTS

| | | | |
|---|---|---|---|
| 3,054,516 | 9/1962 | Joa . | |
| 3,224,307 | 12/1965 | Kinker | 83/86 X |
| 3,392,852 | 7/1968 | Tegner | 414/790.3 |
| 3,901,391 | 8/1975 | Carlson et al. | 414/792 |
| 4,195,959 | 4/1980 | Schmitt | 414/788.9 |
| 4,302,140 | 11/1981 | Donnelly et al. | 414/790.3 |
| 4,815,924 | 3/1989 | Jaatinen | 414/794.3 |

FOREIGN PATENT DOCUMENTS 692793 8/1964 Canada .................. 414/790.3

54-129661 8/1979 Japan .

Primary Examiner—Hien H. Phan
Attorney, Agent, or Firm—Browdy & Neimark

[57] ABSTRACT

A cross-cutting saw for sheets, such as chipboard, plywood or equivalent sheets, the cross-cutting saw including a receiving table for cut-off sheet packages, a spacer strip table following after the receiving table, and a lifting table of the stacking station placed after the spacer strip table, and on which the cut-off sheet packages are stacked for transport. In the adjacency of the receiving table is provided a longitudinal pusher means which can be moved behind the cut-off sheet package. The receiving table can be moved at least in the direction of sheet package movement such a distance that the longitudinal pusher means can be placed behind the sheet package, whereafter the longitudinal pusher means moves the sheet package to the desired, programmed point on the receiving table, and whereafter a transversal pusher means in the adjacency of the receiving table, known in itself in the art, moves the sheet packages on the receiving table onto the spacer strip table, from where the parts of the sheet package can be stacked as desired, in succession or on top of each other, onto the lifting table of the stacking station.

2 Claims, 5 Drawing Sheets

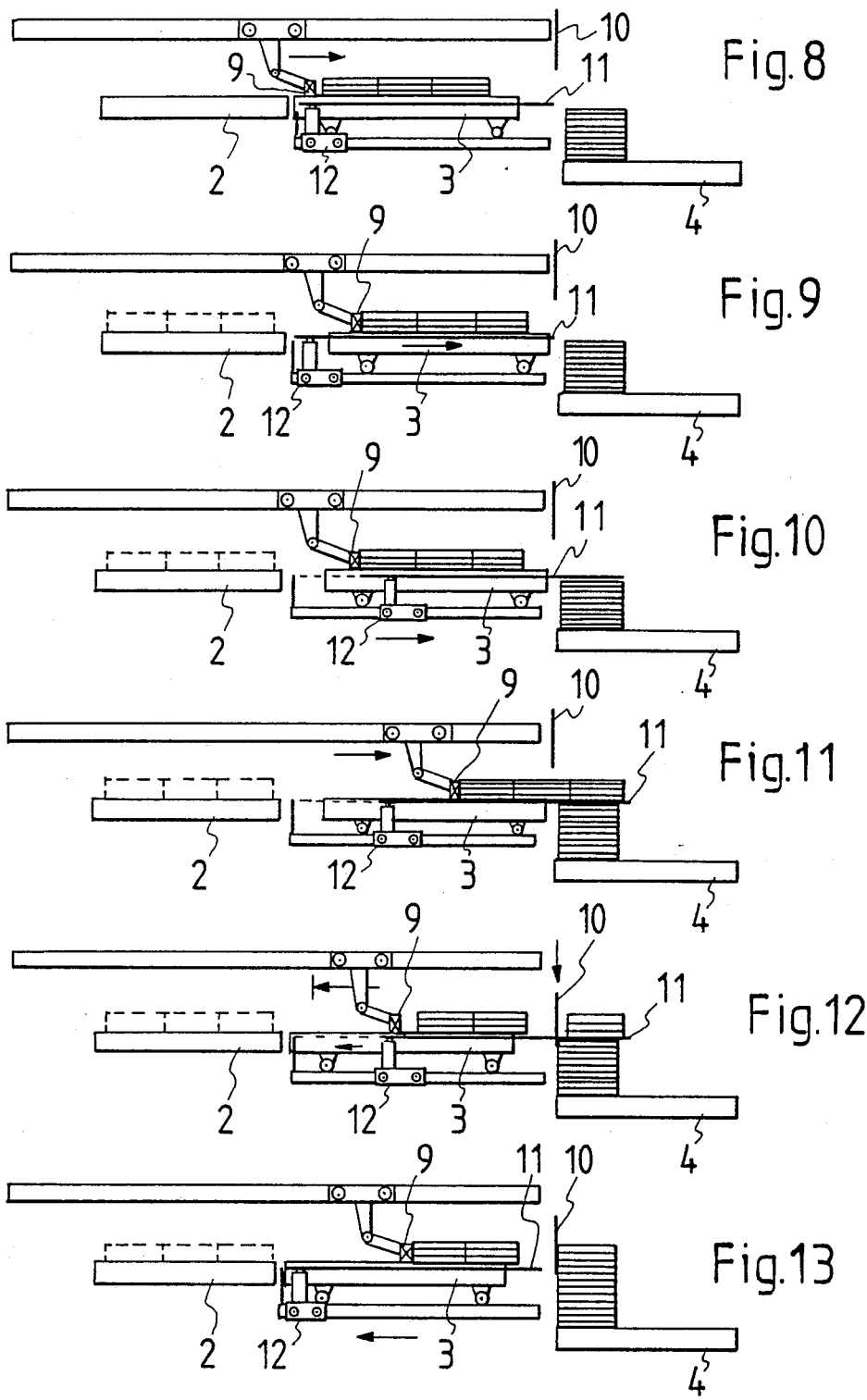

CROSS-CUTTING SAW

The present invention concerns a cross-cutting saw for sheets, such as chipboard, plywood or equivalent sheets, said cross-cutting saw comprising a receiving table for cut-off sheet packages, a spacer strip table placed after the receiving table, and a lifting table of a stacking station following after the spacer strip table, whereupon the cut-off sheet packages are stacked for transport.

This kind of cross-cutting saw is in part disclosed for instance in the Finnish patent application No. 861543. The object of the present invention is to develop further said cross-cutting saw so that it can be used for stacking, not only major orders but also small orders.

The cross-cutting saw of the invention is characterized in that in the adjacency of the receiving table is provided a longitudinal pusher means movable behind the cut-off sheet package, and that the receiving table is movable in the direction of sheet package movement such a distance that the longitudinal pusher means can be placed behind the sheet package, whereafter the longitudinal pusher means moves the sheet package on the receiving table to the desired, programmed point, and whereafter a transversal pusher means known in itself in the art, provided in the adjacency of the receiving table, moves the sheet packages on the receiving table to a spacer strip table, from which the parts of the sheet package can be stacked in the desired manner in succession or on top of one another onto the lifting table of the stacking station. The invention is equally appropriate for a major order, in which it is preferable to stack the entire sawing pattern at one time, and for a smaller order possibly comprising only one sheet package, of which the parts of identical size are wished to be stacked on top of each other. The stacks produced on the lifting table need not be of equal height.

A very essential embodiment of the invention is characterized in that the spacer strips of the spacer strip table are programmably attached to the spacer carriage so that merely those spacer strips which are set under the sheet packages which have been moved onto the spacer strip table move together with the strip carriage to the lifting table or onto the sheet stacks already placed thereupon. All the other spacer strips remain where they are and are locked to the body part of the spacer strip table.

Another advantageous embodiment of the invention is characterized in that the spacer strip table can be substantially moved in the sheet stack movement direction between the receiving table and the lifting table in that a stop lowerable in front of the lifting table can be placed between the sheet package on the lilfting table and the sheet package on the spacer strip table. Hereby, the sheet packages displaced onto the spacer strip table can be easily separated.

The invention is described in the following with the aid of an example by referring to the drawing attached, in which FIG. 1 presents part of the cross-cutting saw in top view.

FIGS. 7-13 illustrates the displacement of sheet packages from the receiving table to the spacer strip table, and further onto the lifting table.

Figure 1:
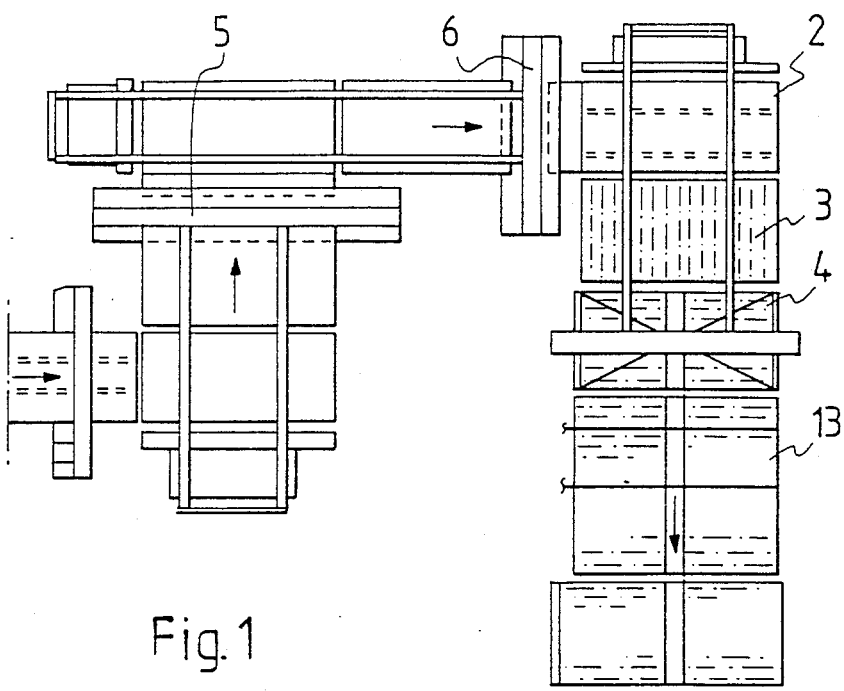
Figure 2:
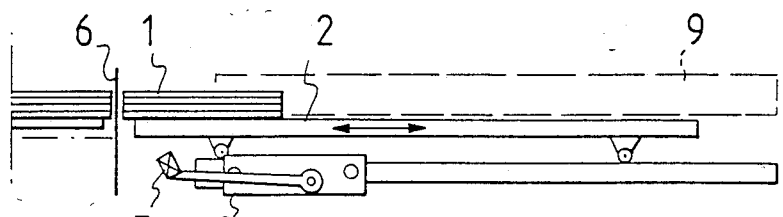
FIGS. 2-6 illustrates the displacement of a sheet package on the receiving table.
Figure 3:
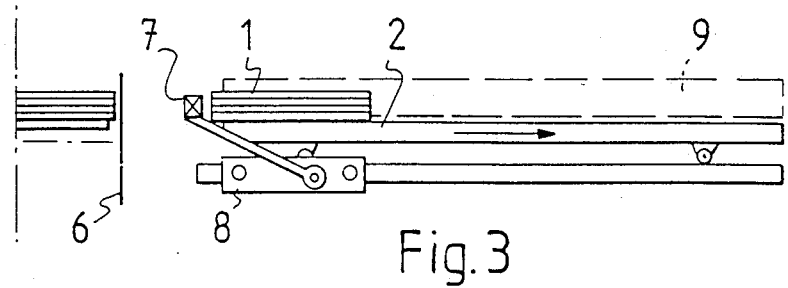
Figure 4:
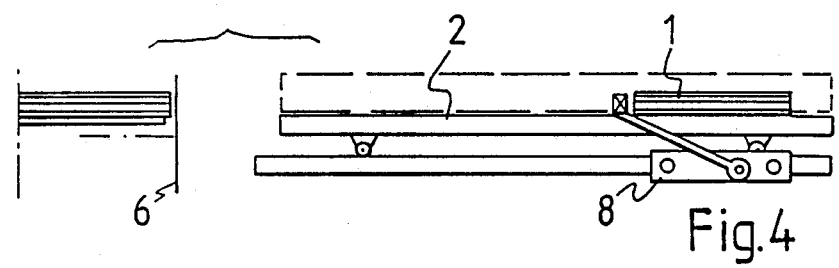
Figure 5:
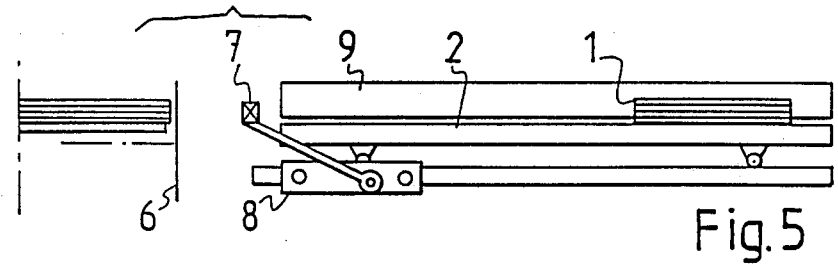
Figure 6:
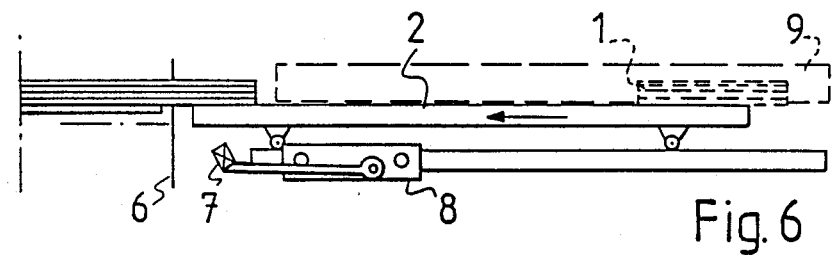
Figure 7:
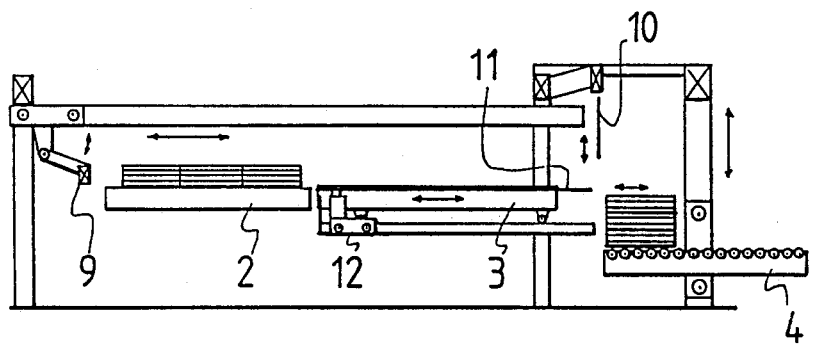
Figures 14, 15, 16, 17:
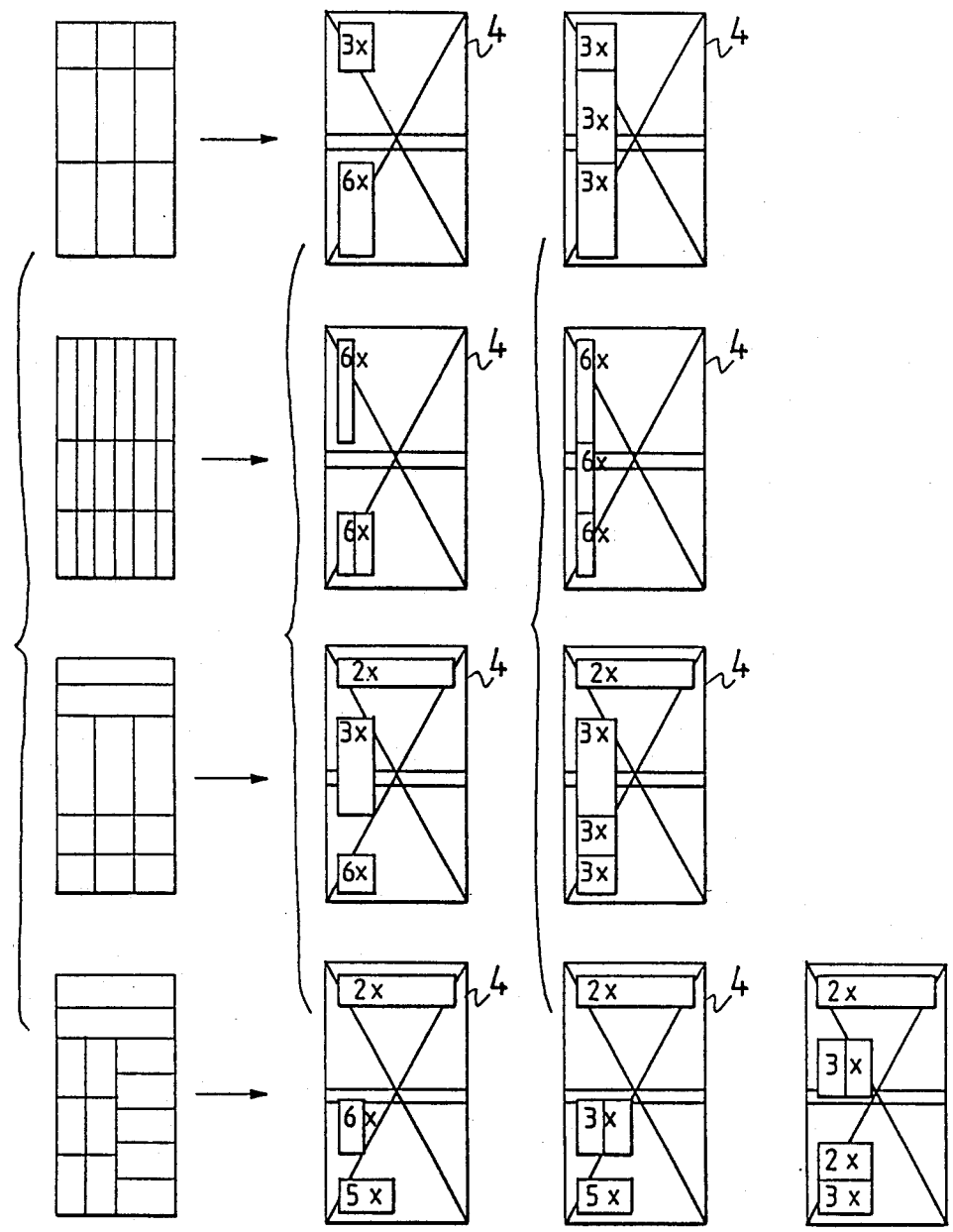
FIG. 14 shows four different cutting patterns of sheet packages.
FIG. 15 shows a possibility of stacking the sheet packages depicted in FIG. 14 onto the lifting table.
FIG. 16 shows another possibility of stacking sheet packages depicted in FIG. 14 onto the lifting table.
FIG. 17 shows a third possibility of stacking the example depicted at the bottom in FIG. 14 onto the lifting table.
Figures 18, 19:
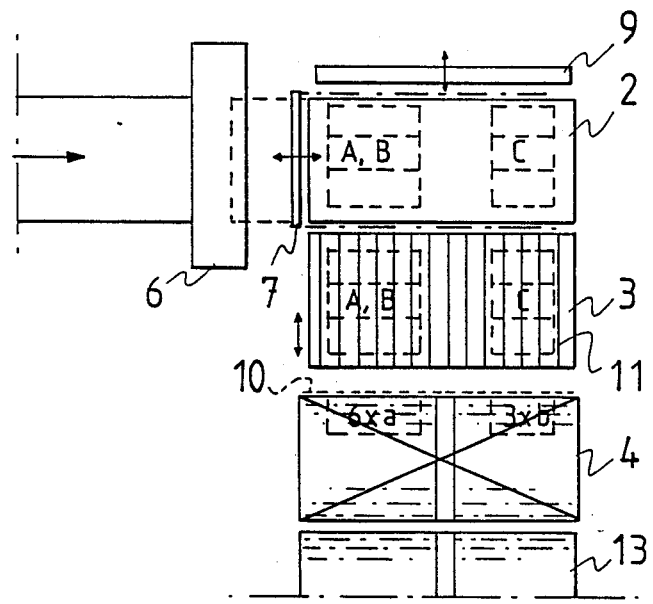

FIG. 18 presents a simple cutting pattern of sheet package.

FIG. 19 illustrates the stacking of the sheet package depicted in FIG. 18 from the receiving table onto the lifting table.

The cross-cutting saw comprises a receiving table 2 for cut-off sheet packages 1, a spacer strip table 3 located after the receiving table, and a lifting table 4 of the stacking station located after the spacer strip table, the cut-off sheet packages being stacked upon the latter in sheet stacks for further transport. The basic sheet packages entering the cross-cutting saw are first cut in the longitudinal direction at the cutting station 5, and the longitudinally cut sheet packages are cut off at the cutting station 6, before the receiving table 2. Adjacent to the receiving table 2 a longitudinal pusher means 7 is provided to be movable behind the cut-off sheet package, moving along with the carriage 8 located under the receiving table. The receiving table 2 can be moved in the direction of sheet package movement at least such a distance, in the manner indicated by arrows, that the longitudinal pusher means 7 can be lifted to enter behind the sheet package, whereafter the longitudinal pusher means displaces the sheet package to the desired, programmed point on the receiving table 2. Thereafter, the transversal pusher means 9, in its basic position behind the receiving table, displaces the sheet packages on the receiving table 2 onto the spacer strip table 3, wherefrom the sheet packages can be stacked in the desired manner, in succession or on top of one another onto the lifting table 4 of the stacking station. The moving of the sheet packages 1 onto the receiving table is shown in FIGS. 2-6, and the displacement of sheet packages from the receiving table onto the lifting table 4 is depicted in FIGS. 7-13. The spacer strip table 3 is also essentially movable in the direction of sheet package movement between the receiving table 2 and the lifting table 4 so that the lowerable stop 10 in front of the lifting table can be placed between the sheet package on the lifting table and the sheet package on the spacer strip table. The spacer strips 11 are programmably attached to the strip carriage 12 so that merely the desired spacer strips move along with the strip carriage 12 onto the lifting table 4 or onto the sheet stack on the lifting table.

Assuming that the order of the example in FIG. 18 has to be filled, comprising one sheet package from which six stacks "a" of identical size and three stacks "b" of identical size are produced, and assuming that it is desired to stack the "a" and "b" stacks on top of each other, the following procedure is used.

When Group C has been cut, the receiving table 2 moves to its rear position and the longitudinal pusher means 7 pushes the group C to the rear part of the receiving table 2. The transversal pusher means 9 displaces the group C onto the spacer strip table 3. The spacer strip table 3 moves about 200 mm to be beside the lifting table, and only those spacer strips 11 which are located under the group C move onto the lifting table a distance equalling the depth of "b". The transversal pusher means 9 pushes the group C forward until the first "b" stack is entirely on the lifting table. The spacer strip table 3 moves backwards about 200 mm, but the spacer strips do not move. The stop 10, which resembles a rake in shape, goes down. The spacer strips 11 withdraw, whereby the sheet package b1 moves backwards along with them until it stops against the stop 10, but the spacer strips continue their withdrawal by sliding out from between the stack and the lifting table. When the spacer strips have completely withdrawn from the lifting table and the stack has settled thereupon, the stop 10 rises up. The lifting table moves downward a distance equalling the height of one stack. The spacer strip table 3 moves to be beside the lifting table 4. The spacer strips 11 located under the group C proceed onto the b1 stack on the lifting table 4. The transversal pusher means 9 pushes the C group forward until the b2 stack is placed on top of the b1 stack and its rear edge has moved 10 to 30 mm past the rear margin of b1. The stop 10 goes down. The spacer strips 11 withdraw back from between the stacks b1 and b2, whereby the b2 stack sets accurately on top of the b1 stack. The b3 stack is in like manner stacked on top of the b2 stack, whereby the group C has been completely stacked. Thereafter, all six "a" stacks, first of Group B and then those of Group A are stacked one on top of the other, but now the stacking takes place at the front end of the lifting table. After both the "b" and "a" stacks have been stacked, the lifting table descends, and the stacks move forward onto the receiving roller track 13. The roller track of the lifting table 4 may be divided into two parts, each having a drive of its own.

For instance, the left-side stack of the A-B group may be taken off, while stacking of the right-hand, lower C group stack may be continued from the sheet package to follow next.

I claim:

1. A conveying and stacking assembly comprising:
 a receiving table for receiving cut-off sheet packages;
 a spacer strip table located downstream of said receiving table;
 a lifting table of a stacking station located downstream of said spacer strip table on which cut-off sheet packages are stacked for transport;
 longitudinal pusher means disposed adjacent to said receiving table and adapted to be moved behind the cut-off sheet packages for pushing the cut-off sheet packages to the desired, programmed point on said receiving table;
 transverse pusher means disposed adjacent to said receiving table for pushing the cut-off sheet packages from said receiving table to said spacer strip table;
 said receiving table being movable at least in the direction of movement of the sheet packages such a distance that said longitudinal pusher means can be placed behind the sheet packages; and
 wherein said spacer strip table comprises spacer strips programmably attached to a spacer strip carriage such that only those spacer strips which enter underneath the sheet packages that have been moved onto said spacer strip table move along with said spacer strip table onto said lifting table or upon the sheet stacks already resting thereon.

2. The conveying and stacking assembly according to claim 1, further comprising a stop disposed in conjunction with said lifting table adapted to be placed between the sheet packages on the lifting table and the sheet packages on said spacer strip table, wherein said spacer strip table is movable in the direction of movement of said sheet stack between said receiving table and said lifting table and upon withdrawal of the spacer strip from under the sheet packages on the lifting table, said stop prevents the sheet packages from moving back onto said spacer strip table.

* * * * *